United States Patent [19]

Sampietro et al.

[11] Patent Number: 5,361,182
[45] Date of Patent: Nov. 1, 1994

[54] MAGNETIC CARRIAGE LATCH FOR A DISC DRIVE

[75] Inventors: Joseph M. Sampietro, Tarzana; Hossein M. Moghadam, Camarillo; Anoush M. Fard, Agoura Hills; Richard G. Krum, Thousand Oaks, all of Calif.

[73] Assignee: Seagate Technology, Inc., Scotts Valley, Calif.

[21] Appl. No.: 975,349

[22] Filed: Nov. 12, 1992

[51] Int. Cl.5 .......................... G11B 5/54; H01H 9/00
[52] U.S. Cl. ..................................... 360/105; 335/179
[58] Field of Search ............................... 360/104–106, 360/97.01, 75

[56] References Cited

U.S. PATENT DOCUMENTS

| | | |
|---|---|---|
| 3,671,893 | 6/1972 | Edgar et al. .......................... 335/179 |
| 3,735,165 | 5/1973 | Touchman et al. .................... 310/49 |
| 3,738,262 | 6/1973 | Dayger et al. ..................... 101/93.14 |
| 3,899,061 | 8/1975 | Krug ................................. 192/84 PM |
| 5,023,736 | 6/1991 | Kelsic et al. ......................... 360/105 |
| 5,024,543 | 6/1991 | Mitsuishi et al. ................... 400/124 |
| 5,170,300 | 12/1992 | Stefansky ............................ 360/105 |
| 5,187,627 | 2/1993 | Hickox et al. ....................... 360/105 |
| 5,224,000 | 6/1993 | Casey et al. ......................... 360/105 |

*Primary Examiner*—Stuart S. Levy
*Assistant Examiner*—Jefferson Evans
*Attorney, Agent, or Firm*—Edward P. Heller, III

[57] ABSTRACT

A disc drive magnetic latch includes a magnet, a bucking coil, and a pair of pole pieces in a housing. The pole pieces have rectangular extension which extend through fingers in the housing thereby locking the pole pieces against rotational movement when a striker on the actuator strikes them. Heat staked tabs hold the assembly together.

6 Claims, 8 Drawing Sheets

MAGNETIC CARRIAGE LATCH FOR A DISC DRIVE

BACKGROUND OF THE INVENTION

1. Field of the Invention

This invention relates generally to the field of rigid disc drive data storage devices and more particularly, but not by way of limitation, to a magnetic latch for the carriage that mounts and carries the heads in such a disc drive.

2. Brief Description of the Prior Art

Disc drive data storage devices of the type known as "Winchester" disc drives are well known in the industry. In such units, a plurality of rigid discs, coated with a magnetic recording medium, are mounted for rotation at a constant high velocity on a spindle motor. An actuator mechanism is included to mount a plurality of heads—typically one per disc surface—and move the heads under control of electronic circuitry to any desired one of a plurality of circular, concentric data tracks on the discs. The actuator mechanism commonly includes some sort of precision guidance apparatus which closely controls the path of movement of the heads, and a motor to drive the heads through their range of motion. That portion of the actuator that mounts the heads is commonly referred to as a "carriage".

Most disc drives of the current technology utilize a type of actuator known as a rotary voice coil actuator. In such a unit, the heads are typically attached via flexures to a vertically aligned array of head mounting arms which are cantilevered outward from an actuator body which is adapted to rotate about a pivot shaft. On the opposite side of the actuator body from the head mounting arms, a coil is fixedly attached, and this coil is supported by the actuator body within the magnetic flux field of an array of permanent magnets. When controlled DC current is applied to the ends of the coil, the magnetic field induced about the coil interacts with the magnetic field of the permanent magnets to rotate the coil about the pivot shah in accordance with the well known Lorenz relationship.

In disc drives of the current technology, such motors have enabled manufacturers to produce products with average access times of less than ten milliseconds (0.010 seconds). As is well known to those skilled in the art, it is necessary to "park and latch" such actuators when the loss of power to the disc drive unit is detected, because voice coil motors have no inherent "magnetic detent" and can only control the relative position of the coil and magnets when power is available to the coil. When a power loss occurs, the discs in a disc drive stop spinning, and the air bearing which supports the heads above the disc surface begins to deteriorate. Since the heads and discs are relatively delicate, it is imperative that uncontrolled contact between the two be eliminated. This is typically done by rapidly moving the heads to a preselected "parking zone" and latching the heads in this position until the restoration of power is detected.

With a voice coil actuator, it is relatively simple to move the heads to a park area, since the application of a fixed DC current of the proper polarity to the coil of the motor will cause the desired motion. Several different schemes have been used to latch the carriage of a disc drive at the park area, including spring-activated latches, solenoid latches, and magnetic latches. A typical spring activated carriage latch includes a spring-biased latch pawl which engages a feature on the carriage when the carriage is moved to the park position. Such a latch requires that some device be included to overcome the spring bias in order to unlatch. This can take any of several forms, including wind vanes which move in response to the acceleration of the discs when power is restored to the disc drive.

Another type of unlatching mechanism frequently used is a solenoid, which must be energized at the proper moment in the power-up sequence for the disc drive to open, or unlatch, the latch. Several types of latches incorporating bi-stable solenoids have been proposed including those described in U.S. patent applications No. 711,311, filed Jun. 6, 1991, now U.S. Pat. No. 5,224,000, issued Feb. 16, 1993, and U.S. patent application No. 866,611, filed Apr. 10, 1992, (Attorney's Docket SEA 8154, Sampietro, et al.), both assigned to the assignee of the present invention and incorporated herein by reference. The main drawback of such latches is that they require that power be used to both latch and unlatch the mechanisms, and power to latch the mechanism at the detection of power loss can be unreliable.

Magnetic carriage latches are also common in the art, such as U.S. Pat. No. 4,725,907, issued Feb. 16, 1988, and U.S. patent applications No. 611,412, filed Nov. 9, 1990, now U.S. Pat. No. 5,224,000, issued Feb. 16, 1993 and U.S. patent application No. 894,417, filed Jun. 5, 1992, (Attorney's Docket SEA 2206, Jue, et al.), all also assigned to the assignee and incorporated herein by reference. These are surely the simplest latches in concept, since they usually incorporate a permanent magnet mounted to a fixed position in the disc drive housing that contacts a striker surface on the actuator when the actuator has been moved to the designated park position. Power to overcome the magnetic latch, and thus release the actuator for movement, is provided by the actuator motor itself. The principal obstacle to be overcome with a magnetic latch is a compromise between the available latching force and the amount of power necessary to overcome the latching force at power-on.

That is, if the latch is capable of exerting a large amount of latching force to hold the carriage in the park position against large amounts of specified non-operating shock, the amount of power required by the actuator motor to overcome the latching force at power on goes up dramatically.

It would obviously be advantageous to have a simple magnetic latch which provides a large amount of latching power, while not requiring a comparably large amount of force be prodded by the actuator motor to unlatch the carriage.

SUMMARY OF THE INVENTION

The present invention describes a magnetic latch for the carriage of a disc drive data storage device. The magnetic latching force is counteracted during the unlatching process by a supplying a short duration current pulse to a bucking coil which induces a magnetic field of a polarity opposite to that of the permanent magnet of the latch to allow less power to be used by the actuator to overcome the latching force at power-on.

It is an object of the invention to provide a magnetic latch for the carriage in a disc drive data storage device that will provide adequate latching power to hold the carriage in a latched position against a known amount of mechanical shock.

It is another object of the invention to provide a magnetic carriage latch for a disc drive data storage device which does not require high power from the actuator motor to overcome the latching force.

It is another object of the invention to provide a magnetic carriage latch for a disc drive data storage device which is simple and inexpensive to manufacture.

These and other objects, features and benefits of the present invention can best be understood by reading the following detailed description of the invention in conjunction with the accompanying drawings.

DETAILED DESCRIPTION OF THE INVENTION

Disc drives of the current technology are typically specified to withstand non-operating mechanical shocks on the order of 75-100 Gs in any orthogonal axis. Since magnetic carriage latches operate solely by the magnetic attraction between a permanent magnet mounted in a fixed location relative to the disc drive housing and a contact feature—usually just a magnetizable plate mounted on the moving portion of the actuator —and the mass to be latched is a known factor, it is necessary to design a permanent magnet circuit with sufficient magnetic power to provide the desired latching force.

In magnetic latches of the prior art, however, this choice must also be balanced against the available torque which the actuator motor is capable of generating. This has lead to many compromise solutions in which either the latching force of the magnetic latch was determined by the power of the actuator motor, or—alternatively—to actuator motors which were forced to develop more power than was necessary for any function other than unlatching the magnetic latch.

In particular, recent small form-factor disc drives of the type utilized in notebook and palmtop computers typically are restricted to very small power allocations, while simultaneously being required to withstand extremely high mechanical shocks.

Figure 1:
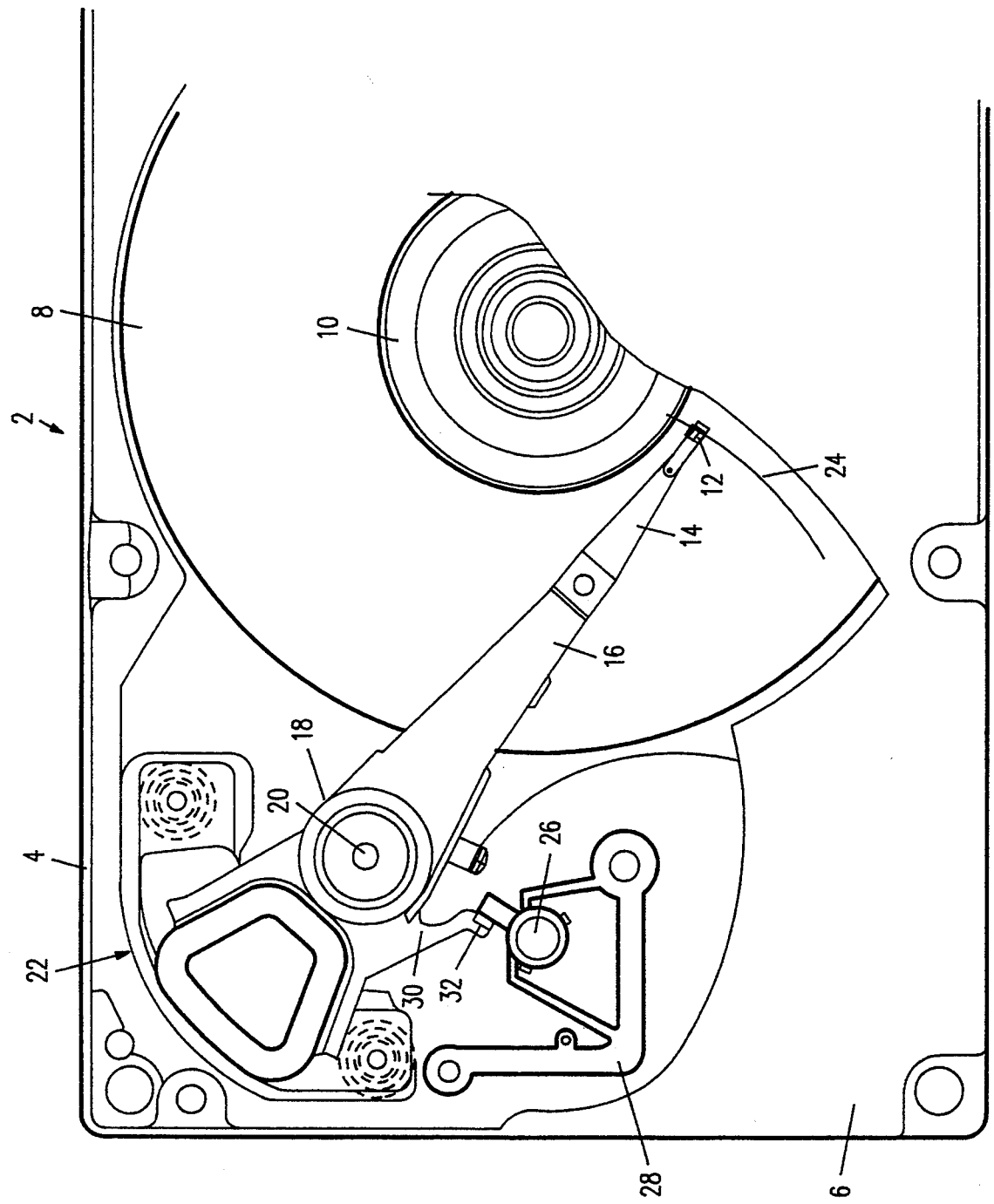
FIG. 1 is a plan view of a disc drive data storage device in which the present invention is particularly useful.

Turning now to the drawings and specifically to FIG. 1, shown is a plan view of a disc drive 2 in which the present invention is particularly useful. The disc drive 2 includes a base member 4 to which all other components are either directly or indirectly mounted, and a top cover 6 which engages with the base member 4 to form a sealed environment which protects the delicate internal components from external contaminants. In the disc drive 2 a plurality of discs 8 are mounted for rotation on a spindle motor (not shown) using a disc clamp 10. An array of vertically aligned heads, one of which is shown and designated 12, are disposed in cooperative arrangement with the discs 8. The heads 12 are attached via flexures 14 to head mounting arms 16 which are an integral part of an actuator body 18. The actuator body 18 is adapted for rotation about a pivot shaft 20 under control of a voice coil motor (VCM), shown generally at 22, and this rotational motion causes the heads 12 to move along arcuate path 24 across the surfaces of the discs 8.

Also shown in FIG. 1 is the magnetic carriage latch 26 of the present invention, which is mounted in a latch housing 28. The latch housing 28 is described in detail in co-pending U.S. patent application Ser. No. 976,247, filed simultaneously with this application, and assigned to the assignee of the present invention. The actuator body 18 also includes an integral latch plate arm 30 which carries a shorting plate 32. The operation of the magnetic latch 26 will be discussed in detail below.

Figure 2:
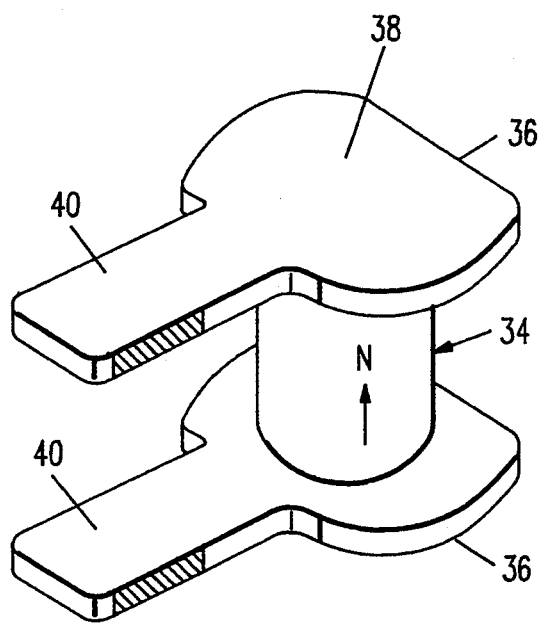
FIG. 2 is a perspective view of the permanent magnet and pole pieces which form a part of a first embodiment of the present invention.

Turning now to FIG. 2, shown is a permanent magnet 34 and a pair of pole pieces 36 which make up a portion of the magnetic latch of the present invention. The permanent magnet 34 is preferably of a neodymium-iron-boron composition, electroless nickle plated, polarized as shown in the drawing, and in the form of a cylindrical solid. The pole pieces 36 are preferably made from any 400 series stainless steel, and act as the contact point between the entire latch mechanism and the shorting plate (32 in FIG. 1) in the area cross-hatched in the figure. The pole pieces 36 are paddle-shaped, with a rounded end 38 and extending beams 40. The pole pieces 36 act as magnetic flux concentrators and will direct the magnetic force of the permanent magnet 34 through any magnetically permeable material which contacts both pole pieces 36 simultaneously, or which contacts one of the pole pieces 36 and comes into close proximity with the other.

Figure 3C:
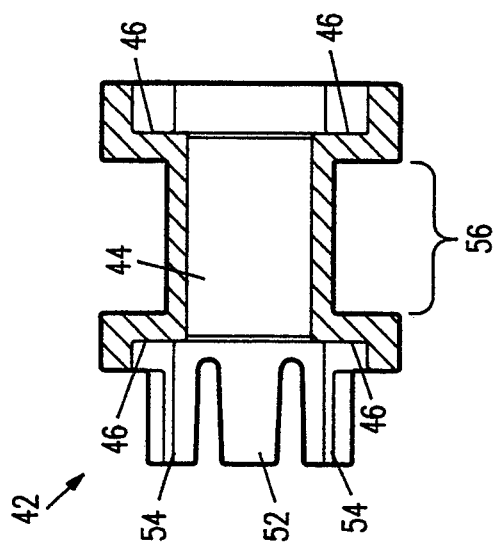
FIGS. 3a, 3b, 3c and 3d are various views of a bobbin which forms a part of a first embodiment of the present invention.
Figure 3D:
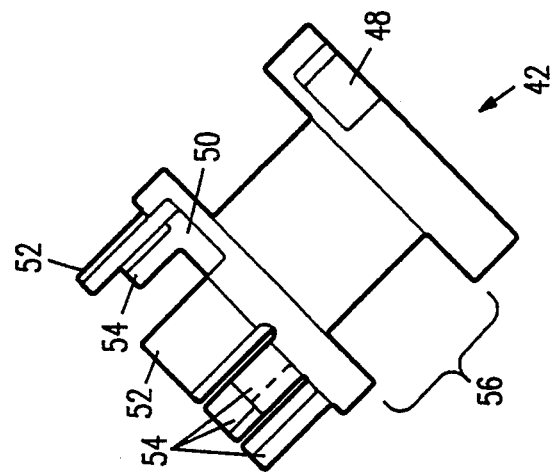
Figure 3A:
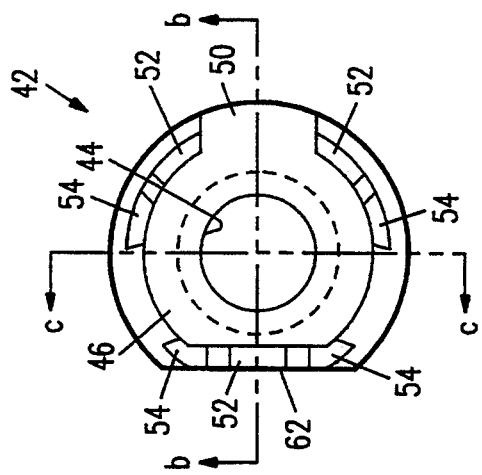
Figure 3B:
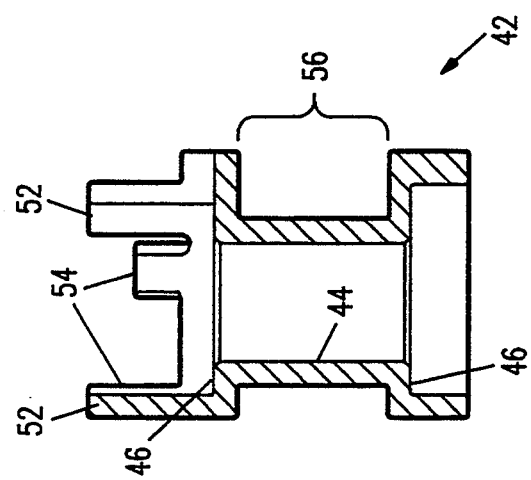

FIGS. 3a through 3d show a bobbin 42 which is another portion of the present invention. More specifically, FIG. 3a is a top plan view, FIG. 3b is a sectional elevation view taken along the line marked b—b in FIG. 3a, FIG. 3c is a sectional side view taken along line c—c of FIG. 3a, and FIG. 3d is a rotated elevation view taken at a position midway between the views of FIGS. 3b and 3c. The bobbin 42 serves as a physical support for the magnet and pole pieces of FIG. 2, and also as a support for a bucking coil, as will be discussed below. The bobbin 42 is preferably made from a non-conducting, non-magnetizable material, such as Victrex ® 450G PEEK, a product of ICI Advanced Materials of Exton, Pa., which was selected not only for its relative strength, but also because of other considerations, such as wear resistance, low flammability, stability over temperature variations and ease of processing. As FIGS. 3a–3d show, the bobbin 42 includes a central bore 44 which is dimensioned to receive the permanent magnet of FIG. 2. At the top and bottom ends of the bore 44 are flat surfaces 46 extending radially from the central bore 44. These flat surfaces 46 are dimensioned to mate with the round ends 38 of the pole pieces 36 at the ends of the permanent magnet (34 in FIG. 2). The bottom of the bobbin 42 is in the general form of an open cylinder with a lower notch 48 provided for the passage of the beam portion 40 of the lower pole piece. A similar upper notch 50 serves a similar function on the top of the bobbin 42. This configuration of bobbin 42 assumes that some mechanism will be used to mount the entire magnetic latch assembly, and that such a mounting mechanism will provide for the physical constraint of the lower pole piece within the bobbin 42. At the top of the bobbin 42 are a number of upwardly projecting fingers 52 which are formed about the perimeter of the top of the bobbin 42. These fingers 52 will be "heat staked", or deformed, to bend over the upper surface of the upper pole piece during assembly of the latch, and thus constrain the upper pole piece within the bobbin 42. A second set of fingers 54 are envisioned to interact with features on the housing which will mount the completed bobbin sub-assembly, as will be discussed below.

In the longitudinal mid-section of the bobbin 42 is a coil-winding area 56 which will be used to support the bucking coil whose function will be discussed below.

Figure 4A:
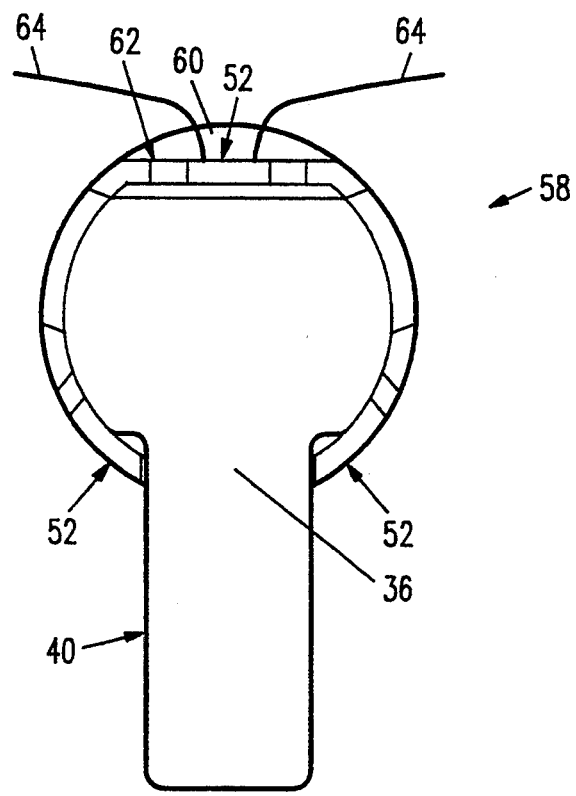
FIGS. 4a and 4b are top plan and sectional elevation views, respectively, of a bobbin sub-assembly which is a part of the first embodiment of the present invention.
Figure 4B:
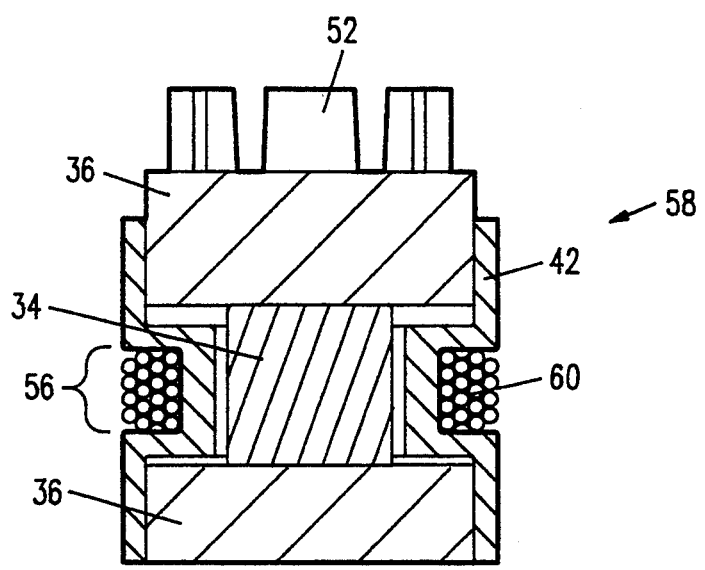

FIGS. 4a and 4b show a top plan view and a sectional elevation view, respectively, of a bobbin sub-assembly 58. In the bobbin sub-assembly 58, the bobbin 42 can be seen to house the permanent magnet 34 and upper and lower pole pieces 36. A coil 60 has been wound around the coil-winding area 56. As can be seen in FIG. 4a, and in FIG. 3a, the back of the bobbin 42—i.e., the side opposite the beam portions 40 of the pole pieces 36—has a flat surface 62. FIG. 4a shows that the coil 60 extends beyond this flat surface 62 at the back of the bobbin 42. This allows a path for the exit of the wire ends 64 from the housing in which the entire sub-assembly will be mounted, as will be described below. The fingers 52 which are used to secure the upper pole piece 36 are shown in their "as molded" condition, before heat staking is used to deform them over the upper pole piece.

Figure 5:
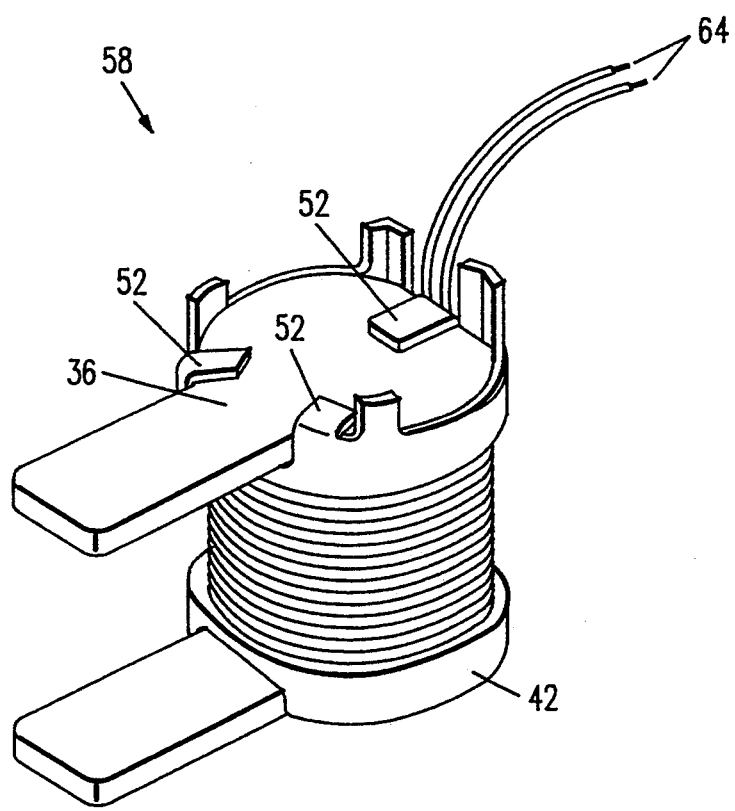
FIG. 5 is a perspective view of the bobbin sub-assembly of FIGS. 4a and 4b.

FIG. 5 is a perspective view of a complete bobbin sub-assembly 58, and clearly shows how the fingers 52 have been deformed to capture and hold the upper pole piece 36 to the bobbin 42. Note also that the two wire ends 64 of the coil 60 have been dressed to exit the sub-assembly 58 at the rear/top of the sub-assembly.

Figure 6A:
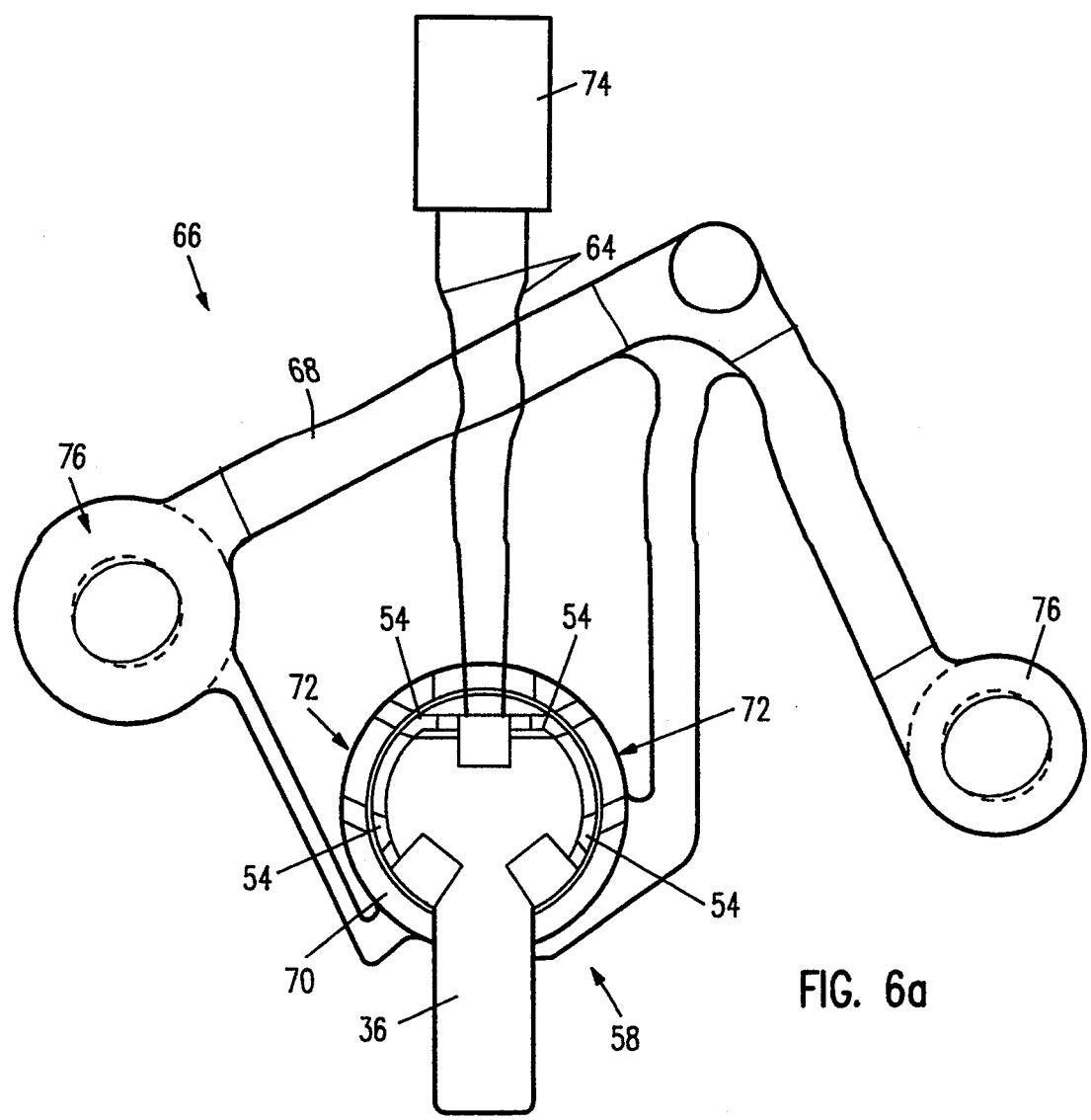
FIG. 6a and 6b are top plan and partially sectioned elevation views, respectively, of a complete latch assembly made in accordance with the first embodiment of the present invention.
Figure 6B:
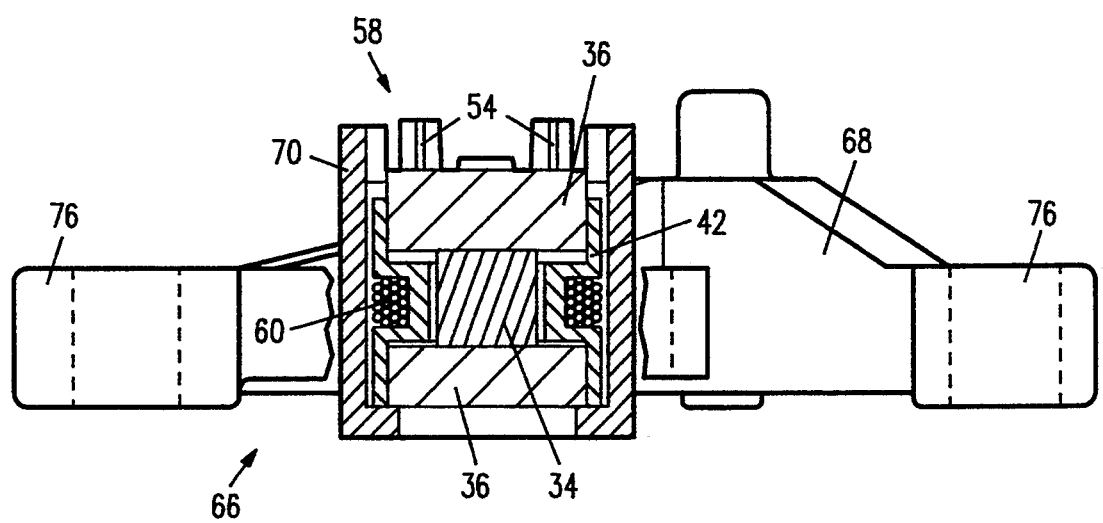

An example of the completed latch assembly 66 is shown in FIGS. 6a and 6b which are plan and elevation views, respectively. The figures include a latch housing 68 and a bobbin sub-assembly 58. In the elevation view of FIG. 6b, a partial section has been taken through the bobbin sub-assembly central axis and through corresponding portions of the latch housing 68. As shown in the figures, the latch housing 68 includes a bobbin receptacle 70 which is in the general form of an open cylinder with a slot to allow the passage of the pole pieces 36 of the bobbin sub-assembly 58. Assembly is accomplished by inserting the bobbin sub-assembly 58 into the bobbin receptacle 70 and heat staking the two retaining tabs 72 at the top of the bobbin receptacle 70 over the top of the bobbin sub-assembly 58. An examination of FIG. 6a will show that the retaining tabs 72 are dimensioned to fit between the unformed fingers 54 at the top of the bobbin 42 and thus contribute to the radial positioning and locking of the bobbin sub-assembly 58. The latch housing 68 can also be seen to extend under the lower pole piece 36 and will thus retain the lower pole piece 36 in contact with the permanent magnet 34 and will also provide a downward positioning stop for the bobbin sub-assembly 58. Note also that the wire ends 64 from the coil 60 have been dressed out the top/rear of the bobbin receptacle 70 and terminated in a connector 74 for later connection to the control logic (not shown) needed to activate the coil 60. The latch housing 68 also includes a pair of mounting features 76 which are used to attach the entire assembly to the base member of the disc drive (4 and 2, respectively, in FIG. 1).

Figure 7:
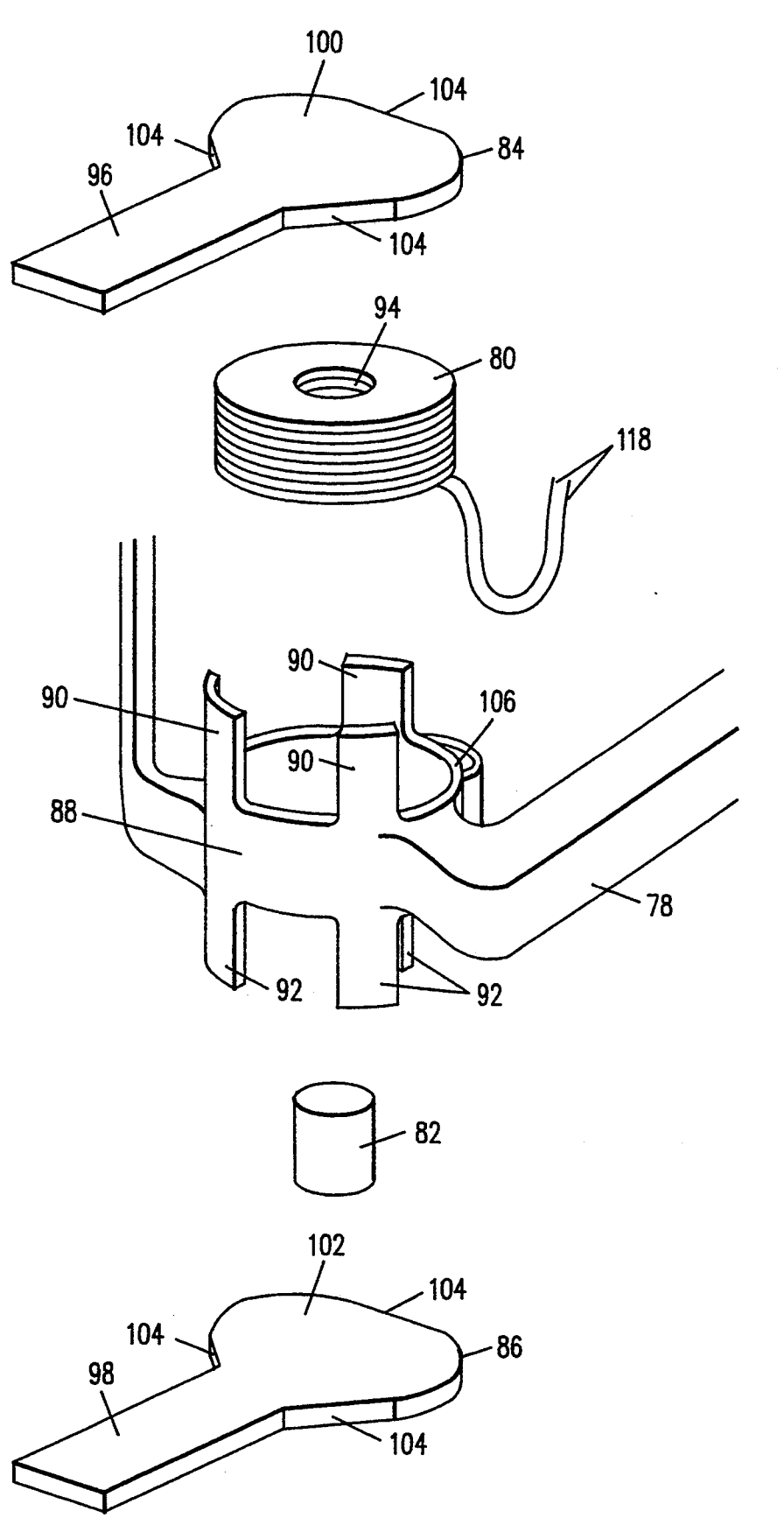
FIG. 7 is an exploded perspective view of a second embodiment of the present invention.

FIG. 7 is an exploded perspective view of a second and preferred embodiment of the invention. This embodiment is preferred because it results in a reduced part count and simpler assembly, which, in turn, result in lowered cost.

The assembly consists of a latch housing 78, a coil 80, a permanent magnet 82, an upper pole piece 84 and an identical lower pole piece 86. The latch housing 78—shown in only partial view—is again molded from Victrex ® 450G PEEK, and includes a latch receptacle portion 88 which is an open cylinder with three upper fingers 90 and three lower fingers 92. The permanent magnet 82 is in the form of a cylindrical solid and dimensioned to fit within the central opening 94 in the coil 80. The coil 80 is wound in a separate operation on a mandrel (not shown) and then bonded in the desired shape using epoxy or a similar material. The upper and lower pole pieces 84, 86 are paddle-shaped, with beam portions 96, 98 and rounded portions 100, 102. The rounded portions 100, 102 each have three flats 104 spaced to correspond with the locations of the upper and lower fingers 90, 92 on the latch receptacle portion 88 of the latch housing 78. The rounded portions 100, 102 of the pole pieces are dimensioned to fit on the top 106 and bottom (not designated) surfaces of the latch receptacle portion 88, allowing simple and effective control of the spacing between the pole pieces 84, 86.

Figure 8:
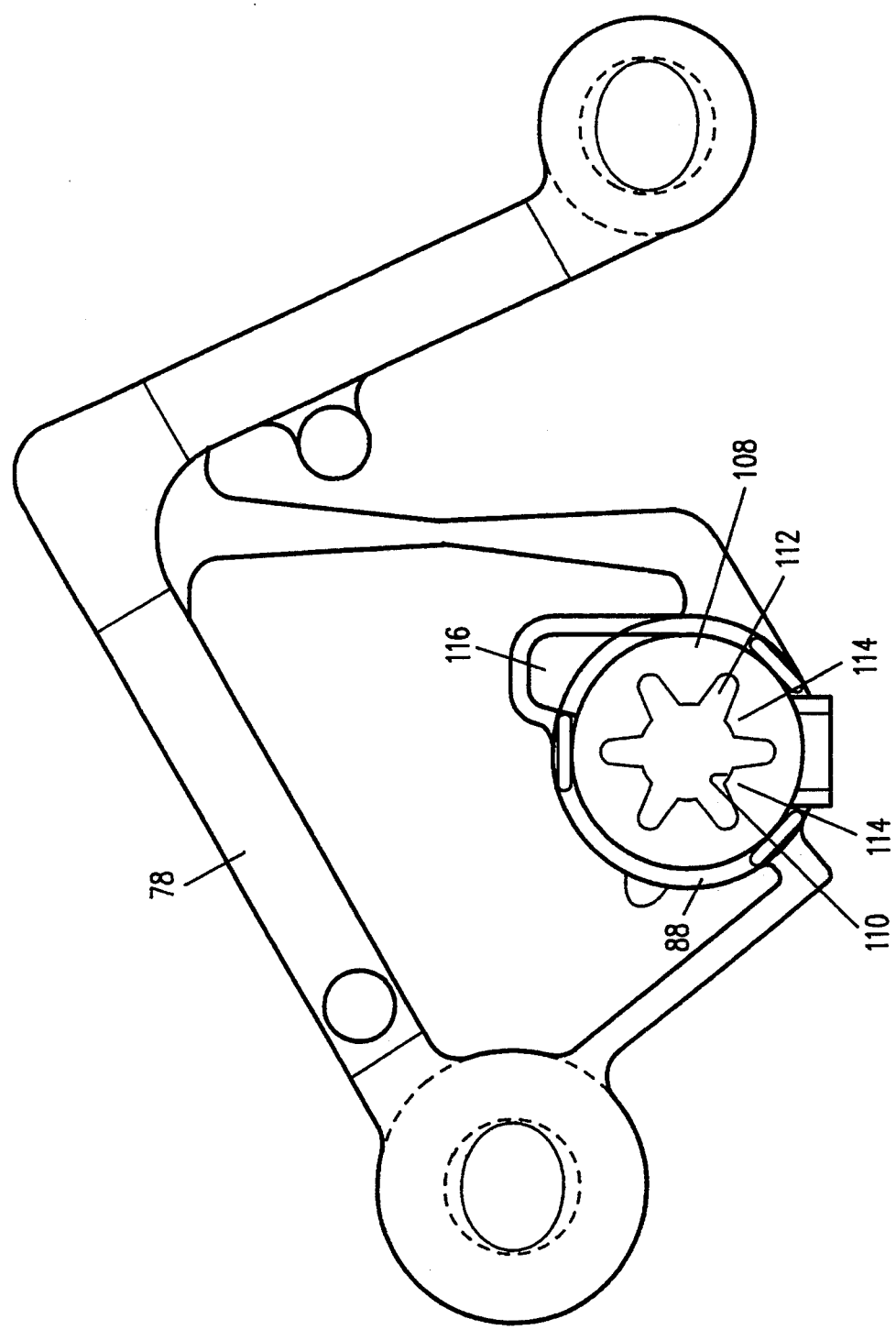
FIG. 8 is a top plan view of a latch housing which forms a part of the second embodiment of the present invention.

To further simplify the assembly process, the latch receptacle portion 88 may be modified to include a feature best seen in FIG. 8.

FIG. 8 is a plan view of the latch housing 78. As can be seen in this view, the central opening of the latch receptacle portion 88 includes a magnet retainer 108, which is an integral part of the latch housing, i.e., the magnet retainer 108 is a "molded-in" feature of the latch housing, and will lie toward the lower portion of the latch receptacle portion 88 of the latch housing, such that the coil (80 in FIG. 7) will rest on the magnet retainer 108 without extending upward past the base of the upper fingers 90. The magnet retainer 108 has an inner diameter 110 slightly smaller than the diameter of the permanent magnet (82 in FIG. 7), and is regularly interrupted by a plurality of radially extending notches 112 which form an array of fingers 114. During assembly, the permanent magnet 82 is inserted from the bottom of the latch receptacle portion 88 of the latch housing and the fingers 114 are slightly bent upward and outward to accommodate the magnet 82. Due to the material characteristics of Victrex ® 450G PEEK, the magnet will be held in place by the fingers 114 of the magnet retainer 108 while the lower pole piece 86, coil 80, and upper pole piece 84 are assembled. Once these components have been brought into their intended positions, the magnetic attraction of the components will hold them in place while the upper and lower fingers 90, 92 of the latch receptacle portion are heat staked to overlap the pole pieces 84, 86 and secure the assembly.

Figure 9:
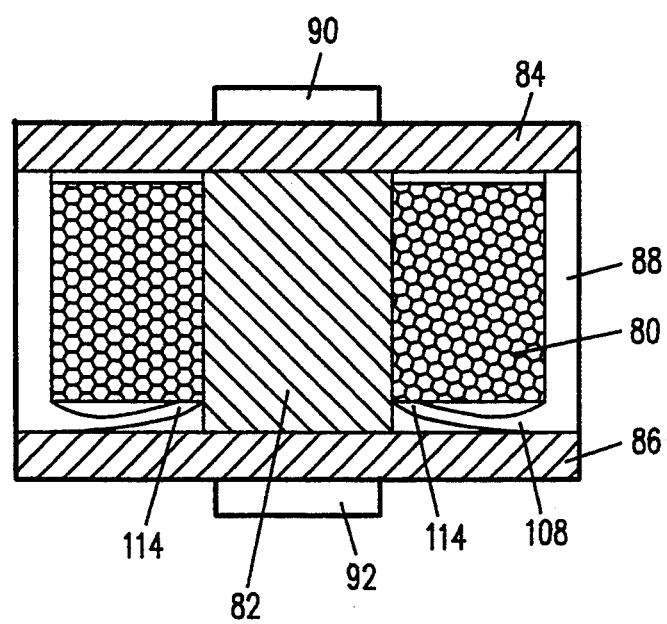
FIG. 9 is a sectional elevation view of a portion of the second embodiment of the present invention.

The operation of the magnet retainer 108 is perhaps easiest to see in FIG. 9, which is a sectional view of the latch receptacle portion of the invention. It is apparent that the magnet retainer 108 is an integral part of the latch receptacle 88, and that the inwardly extending fingers 114 of the magnet retainer 108 are, indeed, deflected slightly upward and outward due to contact with the magnet 82. This sectional view also shows the relationship between the coil 80, the upper and lower pole pieces 84, 86 and the other components of the latch. One of the upper fingers 90 and one of the lower fingers 92 are also shown as they are heat staked to secure the latch components.

Returning now to FIG. 8, the latch receptacle portion 88 of the latch housing 78 includes a wire guide 116 which is used to direct the path of the wire ends 118 of the coil 80. This wire guide 116 is another integrally molded portion of the latch housing 78.

During the latching operation of the invention, the shorting plate (32 in FIG. 1) is brought into contact with the pole pieces of the latch by the rotation of the actuator body (18 in FIG. 1) by the voice coil motor (22 in FIG. 1). Once in this contacting position, any motion of the heads relative to the discs is inhibited.

When power is restored to the latch, a short duration DC current pulse is applied to the coil of the latch. This current pulse induces a magnetic field about the coil which is opposite in polarity to the magnetic field of the permanent magnet, thus counteracting, or "bucking", the magnetic force generated by the permanent magnet. This bucking action can either weaken or totally eliminate the latching force being exerted on the shorting plate, depending on the strength of the magnet, the amount of current applied to the coil, and other factors well know to those skilled in the art. The net result of the bucking action is that a much reduced amount of power must be exerted by the voice coil motor of the actuator to overcome the magnetic latch and move the heads back into operational relationship with the discs. This allows a much more controlled motion of the heads than if the voice coil motor were forced to overcome the latching force of the magnetic latch unassisted.

It will be obvious to those skilled in the art that the present invention is well adapted to achieve the objects and attain the ends set forth above as well as those inherent therein. While a preferred embodiment has been used to explain the invention, modifications may occur to one skilled in the art which are still within the spirit of the invention. The scope of the invention is therefore to be limited only by the appended claims.

What is claimed is:

1. A disc drive magnetic latch comprising:
a magnet;
a pair of upper and lower pole pieces magnetically coupled with said magnet;
a bucking coil mounted about said magnet; and
a housing mounting said magnet, said pole pieces and said bucking coil wherein said housing comprises a cylindrical member and a magnet retainer at one end of the cylindrical member, the magnet retainer comprising a generally circular, coin-shaped member having an outer portion integral with said cylindrical member of said housing, the coin-shaped member further having a plurality of inwardly extending fingers extending from said cylindrical member towards the center of the coin-shaped member and defining an aperture in said coin-shaped member having an inner diameter smaller than said magnet; said magnet being mounted in said retainer and held by irreverence fit with said fingers.

2. The magnetic latch of claim 1 wherein said bucking coil comprises a coil of wire defining an inner diameter slightly larger than said magnet; said coil supported at one end by said retainer.

3. The magnetic latch of claim 2 wherein said housing includes
a plurality of upper and lower vertically extending fingers; and
wherein said pole pieces comprise contact surfaces which extend beyond said housing between adjacent ones of said fingers thereby locking the pole pieces against radial movement in a plane transverse to the fingers.

4. The magnetic latch of claim 3 the housing further including at least one upper deformable tab and one lower deformable tab for retaining said magnet, said bucking coil, and said pole pieces in said housing.

5. In a disc drive having a base member and an actuator, including a moving portion of said actuator for moving an array of heads in cooperative arrangement with at least one disc, an improvement comprising:
a latching system for latching the moving portion of the actuator comprising:
a magnetically permeable shorting plate carried on the moving portion of the actuator; and
a magnetic latch assembly, the magnetic latch assembly comprising;
a magnet;
a pair of upper and lower pole pieces magnetically coupled with said magnet;
a bucking coil mounted about said magnet; and
a housing mounting said magnet, said pole pieces and said bucking coil wherein said housing comprises a generally circular magnet retainer having a plurality of inwardly extending fingers defining an inner diameter smaller than said magnet; said magnet being mounted in said retainer and held by interference fit with said fingers; and
wherein said bucking coil comprises a coil of wire defining an inner diameter slightly larger than said magnet; said coil supported at one end by said retainer; said housing includes a plurality of upper and lower vertically extending fingers; and said pole pieces comprise contact surfaces which extend beyond said housing between adjacent ones of said fingers thereby locking the pole pieces against radial movement in a plane transverse to the fingers.

6. The latching system of claim 5 wherein the housing further includes at least one upper deformable tab and one lower deformable tab for retaining said magnet, said bucking coil, and said pole pieces in said housing.

* * * * *